(12) United States Patent
Yadav et al.

(10) Patent No.: US 9,166,912 B2
(45) Date of Patent: Oct. 20, 2015

(54) TRANSLATING NETWORK FORWARDING PLANE MODELS INTO TARGET IMPLEMENTATION USING SUB MODELS AND HINTS

(71) Applicant: Google Inc., Mountain View, CA (US)

(72) Inventors: Navindra Yadav, Cupertino, CA (US); Daniel Todd Cohn, Oakland, CA (US)

(73) Assignee: Google Inc., Mountain View, CA (US)

( * ) Notice: Subject to any disclaimer, the term of this patent is extended or adjusted under 35 U.S.C. 154(b) by 167 days.

(21) Appl. No.: 13/776,036

(22) Filed: Feb. 25, 2013

(65) Prior Publication Data
US 2014/0241348 A1  Aug. 28, 2014

(51) Int. Cl.
| | | |
|---|---|---|
| H04L 12/771 | (2013.01) | |
| G06F 9/445 | (2006.01) | |
| H04L 12/741 | (2013.01) | |

(52) U.S. Cl.
CPC H04L 45/56 (2013.01); G06F 8/65 (2013.01); H04L 45/563 (2013.01); H04L 45/74 (2013.01)

(58) Field of Classification Search
USPC .......... 370/428, 389; 726/1, 21; 707/694, 706
See application file for complete search history.

(56) References Cited

U.S. PATENT DOCUMENTS

| | | | |
|---|---|---|---|
| 6,760,314 B1 | 7/2004 | Iwata | |
| 7,200,674 B2 * | 4/2007 | Sapuram et al. | 709/238 |
| 8,457,945 B1 | 6/2013 | Fielder et al. | |
| 2002/0052927 A1 * | 5/2002 | Park | 709/217 |
| 2002/0075849 A1 | 6/2002 | Tarle et al. | |
| 2002/0141343 A1 * | 10/2002 | Bays | 370/235 |
| 2003/0128700 A1 | 7/2003 | Bernoth | |
| 2004/0008687 A1 | 1/2004 | Matsubara | |
| 2004/0067953 A1 | 4/2004 | Stein et al. | |
| 2004/0246973 A1 | 12/2004 | Hoang et al. | |
| 2005/0125687 A1 * | 6/2005 | Townsend et al. | 713/200 |
| 2006/0078333 A1 * | 4/2006 | Uga et al. | 398/26 |
| 2006/0193266 A1 | 8/2006 | Siddha et al. | |
| 2007/0223397 A1 * | 9/2007 | Gerasimov et al. | 370/254 |

(Continued)

FOREIGN PATENT DOCUMENTS

EP   2 485 143   8/2012

OTHER PUBLICATIONS

International Search Report and Written Opinion mailed May 28, 2014 in PCT Application No. PCT/US2014/018387.

(Continued)

*Primary Examiner* — Benjamin H Elliott, IV
(74) *Attorney, Agent, or Firm* — Edward A. Gordon; Foley & Lardner LLP (57) ABSTRACT

A routing controller in a communication network may be responsible for issuing routing rules to forwarding devices in the network. Exemplary embodiments allow forwarding functionality to be implemented by the forwarding devices in a device-specific manner. The routing controller may specify a routing rule to be implemented by the forwarding device, and may provide a default or suggested implementation of the function in the specification of the rule. If the forwarding device does not have a predetermined implementation of the function that is specific to the routing device, the forwarding device may use the default implementation provided by the routing controller. However, if the forwarding device does have a predetermined implementation of the function, the forwarding device may override the implementation described in the specification and use the predetermined implementation instead.

22 Claims, 6 Drawing Sheets

(56) References Cited

U.S. PATENT DOCUMENTS

| | | | |
|---|---|---|---|
| 2007/0233840 A1 | 10/2007 | Alstrup et al. | |
| 2007/0274230 A1 | 11/2007 | Werber et al. | |
| 2007/0291754 A1* | 12/2007 | Okagawa et al. | 370/389 |
| 2008/0031149 A1 | 2/2008 | Hughes et al. | |
| 2008/0077382 A1 | 3/2008 | Strehl | |
| 2008/0083010 A1 | 4/2008 | Koehler et al. | |
| 2008/0219277 A1 | 9/2008 | Pratap et al. | |
| 2008/0252518 A1 | 10/2008 | Yeshayahu | |
| 2008/0301308 A1 | 12/2008 | Li et al. | |
| 2008/0307240 A1 | 12/2008 | Dahan et al. | |
| 2009/0067331 A1 | 3/2009 | Watsen et al. | |
| 2009/0172170 A1 | 7/2009 | Rey | |
| 2009/0249473 A1* | 10/2009 | Cohn | 726/15 |
| 2009/0274128 A1 | 11/2009 | Zhang et al. | |
| 2009/0327514 A1 | 12/2009 | Foschiano et al. | |
| 2012/0033666 A1 | 2/2012 | Holness et al. | |
| 2012/0093166 A1* | 4/2012 | Rosenberg et al. | 370/401 |
| 2012/0323381 A1* | 12/2012 | Yadav et al. | 700/286 |
| 2013/0136117 A1* | 5/2013 | Schrum et al. | 370/338 |
| 2013/0163427 A1 | 6/2013 | Beliveau et al. | |
| 2013/0163475 A1 | 6/2013 | Beliveau et al. | |
| 2013/0238774 A1 | 9/2013 | Davison et al. | |
| 2014/0075498 A1 | 3/2014 | Porras et al. | |
| 2014/0129687 A1 | 5/2014 | Halpern | |
| 2014/0146674 A1 | 5/2014 | Wang et al. | |
| 2014/0241348 A1* | 8/2014 | Yadav et al. | 370/389 |

OTHER PUBLICATIONS

Beckmann, Curt. Clearing up the Fog around the FAWG, ONF Blog, URL: https:www.opennetworking.org/?p=373&option=com_wordpress&Itemid=471 (Oct. 18, 2012).

Cohn et al. Of-Futures Primitive Set, Google Docs (http://goo.gl/6qwbg), External Version 0.1 Retrieved from the Internet at URL: https://docs.google.com/document/d/1v_10MCPBZ1RBWYnleN-2v9Pix0HUCtXPCJK0hwKaRRA/edit?pli=1 (Jul. 1, 2011).

International Search Report and Written Opinion on Application No. PCT/US2014/018421 dated Jun. 11, 2014.

Meyer, David. OpenFlow, Software Defined Networking, and Where its All Going, World Telecommunications Congress 2012, (Mar. 4-7, 2012) Retrieved from the Internet: URL: http://www.ieice.org/~wtc2012/Slides/Workshops/WS2-3/WS2-3_2.pdf.

Rinta-Aho et al. The Click2NetFPGA Toolchain, Proceedings of the 2012 USENIX Conference on Annual Technical Conference, Jun. 13, 2012, URL: https:www.usenix.org/system/files/conference/atc12-final16.pdf.

US Notice of Allowance in U.S. Appl. No. 13/776,001 Dtd Sep. 4, 2014.

US Notice of Allowance in U.S. Appl. No. 13/776,026 Dtd Jan. 20, 2015.

US Notice of Allowance in U.S. Appl. No. 13/776,007 Dtd Feb. 5, 2015.

US Office Action in U.S. Appl. No. 13/597,216 Dtd Dec. 31, 2014.
US Office Action in U.S. Appl. No. 13/775,994 Dtd Oct. 2, 2014.
US Office Action in U.S. Appl. No. 13/776,012 Dtd Oct. 23, 2014.
US Office Action in U.S. Appl. No. 13/776,026 Dtd Aug. 26, 2014.
US Office Action in U.S. Appl. No. 13/776,007 Dtd Oct. 8, 2014.

Wundsam et al. NOSIX: A Portable Switch Interface for the Network Operating System, TR-12013, International Computer Science Institute, URL: https://www.icsi.berkeley.edu/pubs/techreports/ICSI_TR-12-013.pdf (Oct. 2012).

US Notice of Allowance in U.S. Appl. No. 13/776,007 Dtd Jun. 24, 2015.

US Office Action in U.S. Appl. No. 13/597,216 Dtd Jul. 16, 2015.

* cited by examiner

TRANSLATING NETWORK FORWARDING PLANE MODELS INTO TARGET IMPLEMENTATION USING SUB MODELS AND HINTS

BACKGROUND

In communication networks, such as telephone networks and data networks including the Internet, information may be sent along a path from a source device to a destination device. The source device and the destination device may be, for example personal computers, servers such as email servers, web servers, or file servers, or other electronic devices capable of sending and/or receiving information via the network.

The information may pass through one or more forwarding devices, such as routers or other electronic devices having the ability to forward the information to another device. The intermediate devices may receive the information and use functions, algorithms, data structures, and rules to determine where and how to forward the information so that the information moves towards its intended destination. These functions, algorithms, data structures, and rules form the "forwarding plane" of the network. The functions, algorithms, data structures, and rules of the forwarding plane may be implemented and/or enforced by one or more forwarding devices in the network.

For example, a forwarding device may receive a packet on an inbound interface, look up the destination address of the packet, and apply a rule which causes the forwarding device to look up the destination address in a particular routing table. The routing table may provide a list of "next destinations" which represent a device to which the packet should be sent. The next destination for a particular packet might be, for example, the final destination device or another intermediate forwarding device. The next destination may be identified by an address stored in the routing table. The next destinations stored in the routing table may be indexed by a final destination of the packet. Thus, by looking up the final destination of the packet (e.g., as identified by a header of the packet), one can retrieve the next destination from the routing table. The forwarding device may then forward the packet on an outbound interface to the identified next destination.

Certain aspects of the forwarding plane can affect the efficiency of the network. These aspects include the specific rules, algorithms, data structures, and functions employed, the manner in which the forwarding plane is implemented, and the location at which the forwarding plane is implemented and/or enforced.

SUMMARY

A routing controller in a communication network may be responsible for issuing routing rules to forwarding devices in the network. Exemplary embodiments allow forwarding functionality to be implemented by the forwarding devices in a device-specific manner. The routing controller may specify a routing rule to be implemented by the forwarding device and may provide a default or suggested implementation of the function in the specification of the rule. If the forwarding device does not have a predetermined implementation of the function that is specific to the routing device, the forwarding device may use the default implementation provided by the routing controller. However, if the forwarding device does have a predetermined implementation of the function, the forwarding device may override the implementation described in the specification and use the predetermined implementation instead.

By using the predetermined implementation, device-specific capabilities, such as improved algorithms or hardware capabilities, can be leveraged on the forwarding device without requiring that all forwarding devices in the network implement the improved device-specific capabilities. Furthermore, it is not necessary that the routing controller maintain a priori information as to which forwarding devices implement improved device-specific capabilities.

According to exemplary embodiments, a specification may be received at an electronic device having forwarding functionality (i.e., a forwarding device). The specification may describe a rule to be applied by a forwarding device. The rule may be a network routing rule, and may make use of a function. Accordingly, the specification may specify the function to be performed by the forwarding device and an implementation, such as a recommended, default or generic implementation, of the specified function.

The specification may be described in a model language that describes a requested capability (e.g., "find the longest prefix match of a subnet mask in a routing table") without specifying how to implement the requested capability (e.g., without specifying a particular algorithm for performing a longest prefix match). The modeling language may support multiple implementations of the specified functionality (e.g., a first algorithm for finding a longest prefix match, and a second algorithm for finding a longest prefix match).

The specified function may be compared a set of known functions by the forwarding device. The set of known functions may be stored, for example, in a database of known functions. The known functions may have predetermined implementations that are prescribed by the forwarding device. For example, the specified function may be natively implemented in hardware or in software in the forwarding device. The predetermined implementation may differ from the implementation described in the specification from the routing controller.

In some embodiments, the specified function may be located in the set of known functions. Accordingly, the implementation specified in the specification may be disregarded. The specified function may be implemented on the forwarding device using the predetermined implementation prescribed by the forwarding device.

The specification may provide one or more parameters for the rule, such as one or more input values to be used in conjunction with the rule. If the implementation specified in the specification is disregarded, the provided parameters may still be used with the predetermined implementation.

In order to improve the efficiency of implementing the specified function, the forwarding device may utilize hints provided in the specification. For example, the function may be associated with an identifier in the specification. The identifier may provide information related to the functionality of the function, such as a role of the specified function. Using the identifier or the role, a predetermined implementation of the function may be located on the forwarding device. Thus, even if the predetermined implementation is already in a compiled state, it is not necessary to decompile the implementation of the specified function in order to use the implementation of the specified function.

The specification may further specify a submodel that identifies a group of functions associated with a group identifier. The group identifier provide a hint in a similar manner to the function hints described above. If the forwarding device is preprogrammed with a submodel that supports the role suggested by the submodel identifier, then the forwarding device may make use of the submodel without attempting to identify or decompile individual functions within the submodel.

In some embodiments, the forwarding device may fail to locate the specified function in the set of known functions. Accordingly, the forwarding device may implement the specified function using the implementation specified by the specification.

In some embodiments, a routing system is provided. The routing system may include a routing controller that formulates a specification to be employed by a forwarding device. The specification may incorporate a network routing function. The specification may specifying a recommended implementation of the function and provide a flag indicating that the recommended implementation may be overridden if the forwarding device natively implements the function. The routing system may further include a transmitter for forwarding the rule towards the forwarding device.

DETAILED DESCRIPTION

As described in more detail below, exemplary embodiments allow some of the functionality of the forwarding plane to be implemented by the forwarding device in a device-specific manner. A forwarding controller in the network may be responsible for issuing forwarding rules to forwarding devices in the network. The forwarding rules for a particular forwarding device may be packaged in a specification.

One of the forwarding rules may make use of a function. As used herein, a function is a defined set of procedures or steps that performs a task or tasks. A function may be an algorithm, a piece of source code, a program or subprogram, a routine or a subroutine, a procedure, or a method (such as a Java method), among other possibilities.

In exemplary embodiments, functions may be implemented by the forwarding device which receives the forwarding rule. For example, the forwarding device may be pre-programmed with a predetermined implementation of the function. The predetermined implementation may make use of certain capabilities that are specific to the forwarding device that implements the function. For example, the forwarding device may include predetermined hardware or software logic for carrying out operations defined in the function (e.g., an efficient implementation of a longest prefix match function for finding a routing table entry with the greatest matching subnet mask).

Because the predetermined implementation may make use of improved capabilities present on the forwarding device, the predetermined implementation may be more efficient (e.g., in terms of memory, processing power, or processing time) or otherwise improved over a generic implementation that does not make use of the specific capabilities of the forwarding device.

Exemplary embodiments described herein may be employed in an existing network on an ad hoc basis. For example, a forwarding device having pre-programmed implementations of functions used for forwarding may be added to an existing network employing devices without pre-programmed function implementations.

Accordingly, the forwarding controller responsible for issuing the forwarding rules may not be aware of a presence of the pre-programmed implementation on a particular forwarding device, and not every forwarding device will have a predetermined or pre-programmed implementation for a given function. Therefore, according to exemplary embodiments, the forwarding controller may also provide a default or suggested implementation of the function in the specification of the rule. If the forwarding device that receives the specification does not have a predetermined implementation of the function that is specific to the forwarding device, the forwarding device may use the default implementation provided by the forwarding controller. However, if the forwarding device does have a predetermined implementation of the function, the forwarding device may override the implementation described in the specification and use the predetermined implementation instead. This procedure allows forwarding devices employing improved predetermined functionality to be used alongside forwarding devices without such predetermined functionality.

Figure 1:
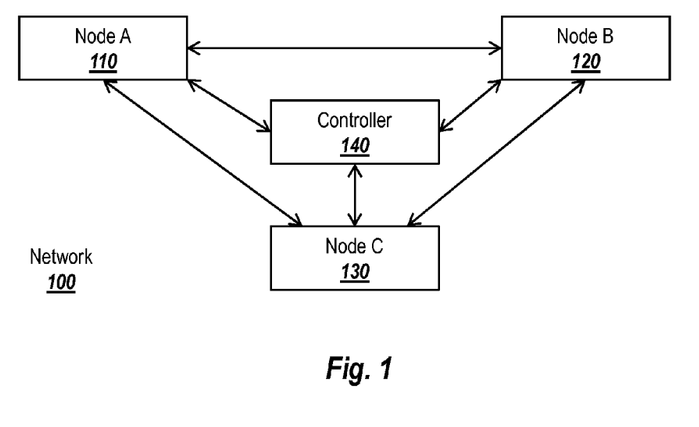
FIG. 1 depicts an exemplary network 100 including forwarding devices and a routing controller according to an exemplary embodiment.

FIG. 1 depicts an exemplary network 100 including forwarding devices and a forwarding controller according to an exemplary embodiment. The network 100 may be a communications network such as the Internet, an intranet, or a telephone network, among other possibilities. The network 100 may include one or more optical, electronic, or other transmission mediums.

The network 100 may include a first node 110, a second node 120, and a third node 130. It is understood that the network 100 is for explanatory purposes only, and a network suitable for use with the exemplary embodiments described herein may have any number of nodes. The nodes 110, 120, 130 may be electronic devices, such as personal computers, tablets, servers, routers, switches, or custom electronic network devices, among other possibilities. For example, the first node 110, second node 120, and third node 130 may be devices having forwarding functionality such that the nodes 110, 120, and 130 are capable of receiving incoming information on an inbound interface, processing the information to determine a next destination of the information, and forwarding the information to the next destination on an outbound interface.

According to an exemplary embodiment, the network 100 may include a controller 140 for communicating with the first node 110, second node 120, and third node 130. As shown in FIG. 1, the controller 140 may be connected to the nodes 110, 120, 130, either directly or indirectly.

The controller 140 may be capable of issuing commands and/or formulating rules to be carried out or applied by the nodes 110, 120, 130. For example, the controller 140 may implement network forwarding logic, in hardware or software, which determines how the forwarding plane of the nodes 110, 120, 130 should forward received messages.

The controller 140 may control the forwarding plane of the nodes 110, 120, 130 by formulating device models, submodels, or networking primitives and forwarding the models, submodels, or primitives to the nodes 110, 120, 130. A networking primitive may represent a basic networking functionality that the nodes 110, 120, 130 are assigned, such as "implement round-robin scheduling." A submodel may represent a collection of network primitives that provides a compartmentalized or modular group of functionalities that can be used by different devices. A model may represent a collection of submodels or primitives that, collectively, define or describe the desired networking behavior of the device implementing the model. Hence, a model may describe the desired behavior of the forwarding plane for the device. Models, submodels, and primitives are discussed in more detail with respect to FIG. 6, below.

Different models, submodels, or primitives may be sent to each of the nodes 110, 120, 130, or the nodes 110, 120, 130 may be sent the same or overlapping models, submodels, or primitives.

Using the configuration described in FIG. 1, the controller 140 may act as a centralized authority which can control the routing or forwarding policies in the network 100. Thus, a network administrator may make changes to the forwarding policies at the controller 140, which then instructs the individual nodes 110, 120, 130 what types of policies to implement. Alternatively or in addition, the controller 140 may set forwarding policies dynamically, based on predetermined factors or by monitoring the status of the network 100.

Figure 2:
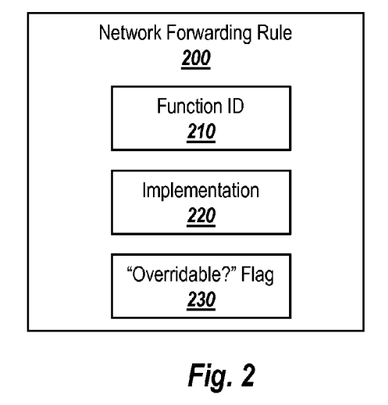
FIG. 2 depicts an exemplary network routing rule 200 generated by the routing controller and sent to a forwarding device.

In order to effect the desired behavior of the nodes 110, 120, 130, the controller may formulate rules, such as network routing rules and/or network forwarding rules, and send the rules to the nodes 110, 120, 130. An exemplary network forwarding rule 200 is shown in FIG. 2.

The network forwarding rule 200 may describe a desired behavior of a node under certain conditions, such as upon the receipt of an incoming packet. The desired behavior may be specified in terms of one or more function identifiers 210. The function identifier 210 may identify a function representing a defined set of procedures or steps that performs a task or tasks. The function identified by the function identifier 210 may be an algorithm, a piece of source code, a program or subprogram, a routine or a subroutine, a procedure, or a method (such as a Java method), among other possibilities.

The function identifier 210 (e.g., the function name) may provide a high-level description of the desired functionality to be implemented by the function. However, there may be many ways to implement the functionality suggested by the function identifier 210. For example, if the function identifier 210 suggests that the function sorts a list (e.g., the function identifier 210 is "sort_list"), then the function could implement list sorting using many different well-known sorting algorithms (e.g., bubble sort, insertion sort, quick sort, etc.).

The network forwarding rule 200 is created by the controller with the understanding that the forwarding device which implements the network forwarding rule 200 may or may not have a native predetermined implementation of the rule 200 or the function identified by the function identifier 210. Accordingly, in case the forwarding device does not natively implement the rule 200 or the function identified by the function identifier 210, a default or generic implementation 220 may be specified in the network forwarding rule 200. The default or generic implementation may be a recommended algorithm provided by the controller which implements the functionality suggested by the function identifier 210.

However, if the forwarding device natively implements a predetermined version of the of the rule 200 or the function identified by the function identifier 210, the native predetermined implementation may be more efficient or otherwise improved as compared to the generic or default implementation 220. Accordingly, the network forwarding rule 200 provides an "Overridable?" flag 230 which specifies whether the generic or default implementation 220 may be overridden. If the "Overridable?" flag 230 is set to "Yes" or "1," for example, then the forwarding device may disregard the generic or default implementation 220 in favor of using the predetermined natively-implemented implementation of the forwarding device. If the "Overridable?" flag 230 is set to "No" or "0," then the forwarding device may not disregard the implementation 220 suggested by the controller and may use the implementation 220 in place of the native implementation implemented by the forwarding device.

One or more network forwarding rules 200 may be collected in a specification of network forwarding rules, which may be sent from the controller to one or more devices having forwarding functionality. A collection of network forwarding rules may be packaged as a model or a submodel. Such a collection may be identified by a common identifier. Individual network forwarding rules 200 may also be identified by individual identifiers, and functions within the rules 200 may also be identified by function identifiers 210.

Any of the above-noted identifiers may be leveraged to provide a hint regarding the desired role or functionality to be implemented by the function, rule, model, or submodel. For example, one commonly performed task is to find the longest prefix match of a subnet mask in a routing table. By naming a function, for example, "longest_prefix_match" or "LPM," the controller may provide a hint that the function provides an implementation for an algorithm that performs this common task.

Accordingly, the forwarding device implementing the forwarding functionality that receives the function, rule, model, or submodel may analyze the identifier of the function, rule, model, or submodel. The forwarding device may analyze the identifier for a hint, such as semantic information relating to the identifier that suggests the role or functionality to be performed by the function, rule, model, or submodel. In addition to the identifier, other information, such as a designated location in a header of the function, rule, model, or submodel.

Figure 3:
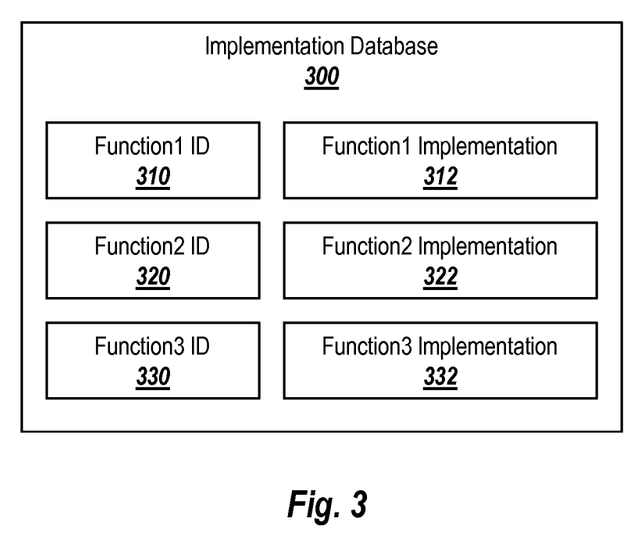
FIG. 3 depicts an exemplary implementation database 300 that stores implementations of predetermined functions implemented by a device with forwarding functionality.

After a hint relating to the identifier is identified, the hint may be compared to identifiers in a database describing predetermined functionality implemented natively by the forwarding device. For example, FIG. 3 depicts an implementation database 300 describing functions that are implemented natively by the forwarding device. It should be noted that, although the implementation database 300 in FIG. 3 relates to functions, information relating to rules, models, and submodels may also be provided in the implementation database 300 or in another database.

The implementation database 300 may be present at the forwarding device. Alternatively, the implementation database 300 may be present at a location that is remote from the forwarding device, and may be accessed by the forwarding device via the network.

The implementation database 300 may provide implementation details for one or more functions natively implemented by the forwarding device associated with the implementation database 300. The implementation details may be indexed based on a function identifier. For example, the implementation database 300 may include an identifier 310 and an implementation 312 for a first function, an identifier 320 and an implementation 322 for a second function, and an identifier 330 and an implementation 332 for a third function. The implementations 312, 322, 332 provide details (such as algorithms) for implementing the functionality described by the function IDs 310, 320, 330. The implementations 312, 322, 332 may be stored in a compiled format so that the implementations 312, 322, 332 can be executed by the forwarding device without the need to compile the implementations 312, 322, 332.

Upon receipt of a rule including a function, the forwarding device may analyze the rule or function for implementation hints as noted above. For example, semantic information may be extracted from the rule or function and compared to the function identifiers 310, 320, 330 to determine whether a close match exists between the hint and one or more of the function identifiers 310, 320, 330. The match does not need to be an exact match. For example, the hint may specify that the function used in the rule implements "longest_prefix_match." Such a hint may be matched to a function in the implementation database 300 which is associated with the identifier "longest_prefix_match" (e.g., an exact match) or "longest-prefix-match" or "LPM," or a variation of this identifier.

If a match for the rule or function is identified in the implementation database 300, the forwarding device associated with the implementation database 300 may use the native implementation 312, 322, 332 in place of the implementation suggested by the rule sent from the controller. Such a procedure is described below with reference to FIG. 4.

Figure 4:
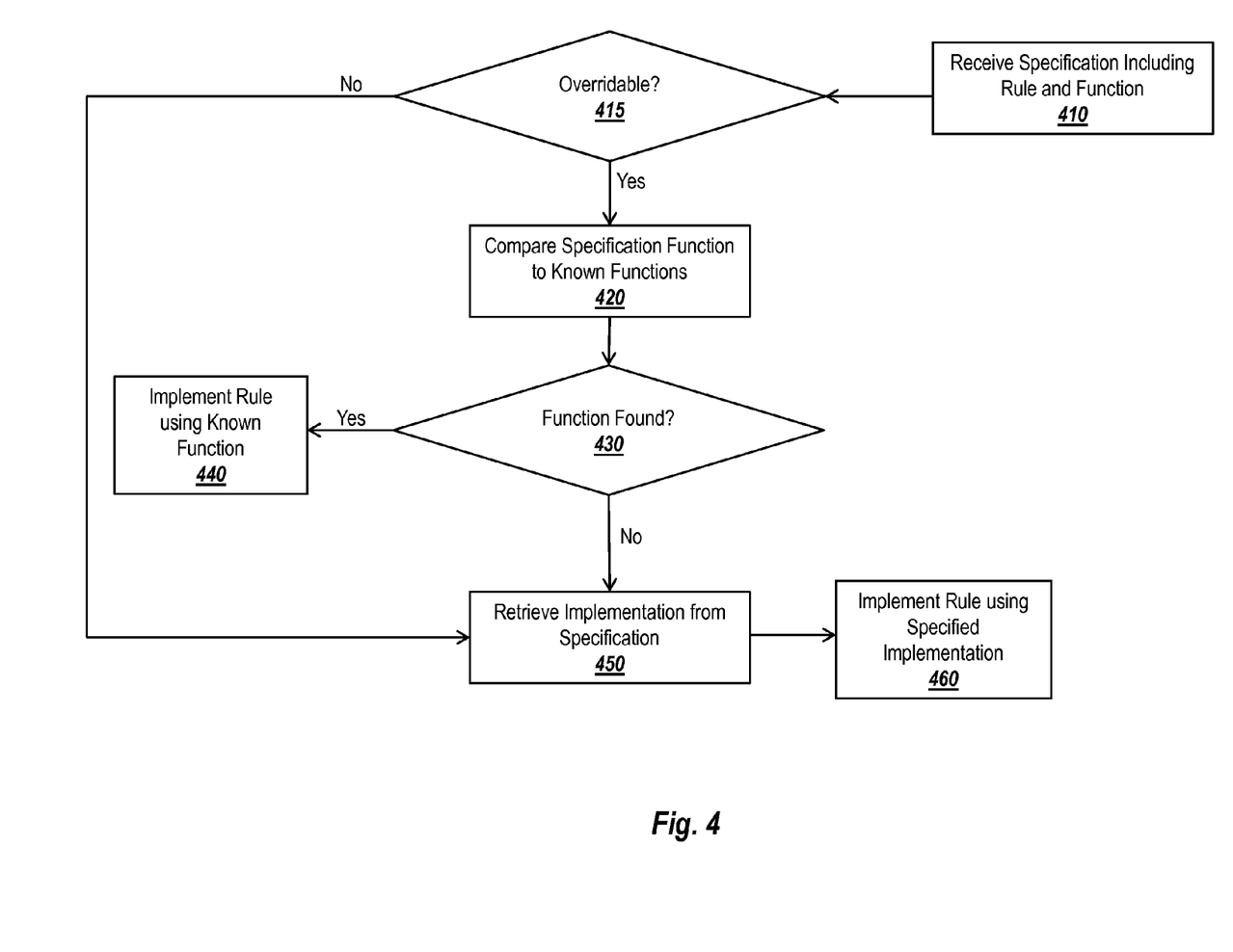
FIG. 4 is a flowchart describing exemplary steps performed by a forwarding device in accordance with an exemplary embodiment.

At step 410, an forwarding device implementing forwarding functionality may receive a specification from the controller. The specification may include a rule which makes use of a function. In some embodiments, the specification may specify a submodel or model, including a collection of rules and/or networking primitives, associated with a hint such as a submodel identifier or model identifier.

At step 415, the forwarding device may examine the rule and/or function to determine whether the function is overridable. For example, the forwarding device may examine the rule and/or function for the presence of an "Overridable?" flag.

If the rule or function is found to be overridable at step 415, then at step 420 the forwarding device may compare the function, rule, model, or submodel specified in the specification to a list of known functions, rules, models, or submodels natively implemented by the forwarding device. For example, the list of known functions, rules, models, or submodels may be stored in an implementation database indexed by identifiers. At step 430, the function, rule, model, or submodel specified in the specification may be looked up in the database (e.g., by hashing the function, rule, model, or submodel specified in the specification) to determine if a corresponding native implementation is present in the implementation database.

If the function is not found to be overridable at step 415, then processing may proceed to step 450.

If it is determined at step 430 that the function, rule, model, or submodel specified in the specification is present among the known functions, rules, models, or submodels natively implemented by the forwarding device, then at step 440 the forwarding device may implement the rule specified at step 410 using the predetermined native implementation from the implementation database. The predetermined native implementation may differ from the implementation specified in the specification from the controller.

If the implementations stored in the implementation database are stored in a compiled format, then the implementation need not be decompiled if the implementation was identified, for example, by comparing a hint from the specification with a function identifier stored in the function database. Thus, the forwarding device may save processing power, time, and resources by using the hints provided by the specification regarding the role of the function.

If the determination at step 430 is that the function, rule, model, or submodel specified in the specification is not present among the known functions, rules, models, or submodels natively implemented by the forwarding device, then at step 450 a recommended, generic, or default implementation may be retrieved from the specification received at step 410. For example the rule may be present in a predetermined format (such as the format shown in FIG. 2), and the implementation may be present at a known location in the rule. Accordingly, the forwarding device may retrieve the implementation from the known location. Alternatively, the rule may include header information providing details regarding the location and size of the implementation within the rule (or a remote location from which the implementation may be retrieved). Using this information, the forwarding device may retrieve the implementation.

At step 460, the forwarding device may implement the rule using the recommended, default, or generic function specified in the specification.

Alternatively, an attempt may be made to retrieve a device-specific implementation from a remote location or a library. For example, the forwarding device may connect to a server containing a library of function implementations and retrieve a function implementation from the library, if one exists.

Figure 5:
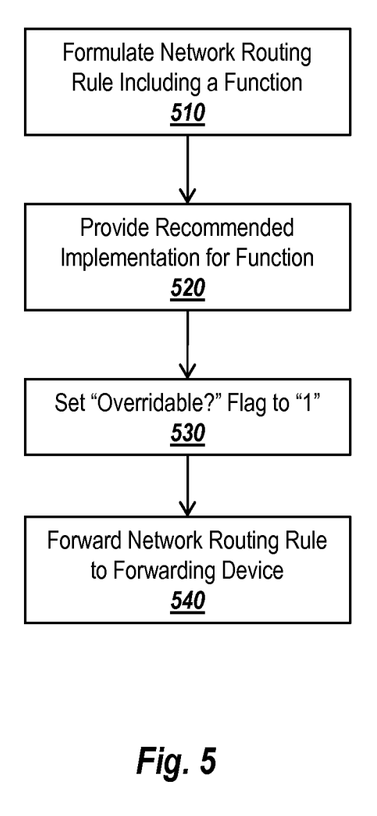
FIG. 5 is a flowchart describing exemplary steps performed by a routing controller in accordance with an exemplary embodiment.

In order to generate the above-described specification, the controller (e.g., the forwarding controller 140 of FIG. 1) may produce the specification in accordance with a process such as the one described in FIG. 5.

At step 510, the controller may formulate a network forwarding rule including a function. The network forwarding rule may be formulated based on a list of rules stored at the controller or accessible by the controller. The selection of a particular network forwarding rule may be determined based on a number of factors, such as the size or number of connections in the network, the time of day, the level of network traffic, the particular forwarding devices present in the network, a configuration of servers present in the network, or the specification of a network administrator, among other possibilities.

The function and/or rule may be provided with an identifier, which may serve as a hint as to the desired role of the function or rule. The identifier may be stored in the list of rules, may be stored with the function, may be accessed remotely by looking up an identifier for the function or rule in a remote library or database, or may be derived directly from the function or rule, among other possibilities.

Figure 6:
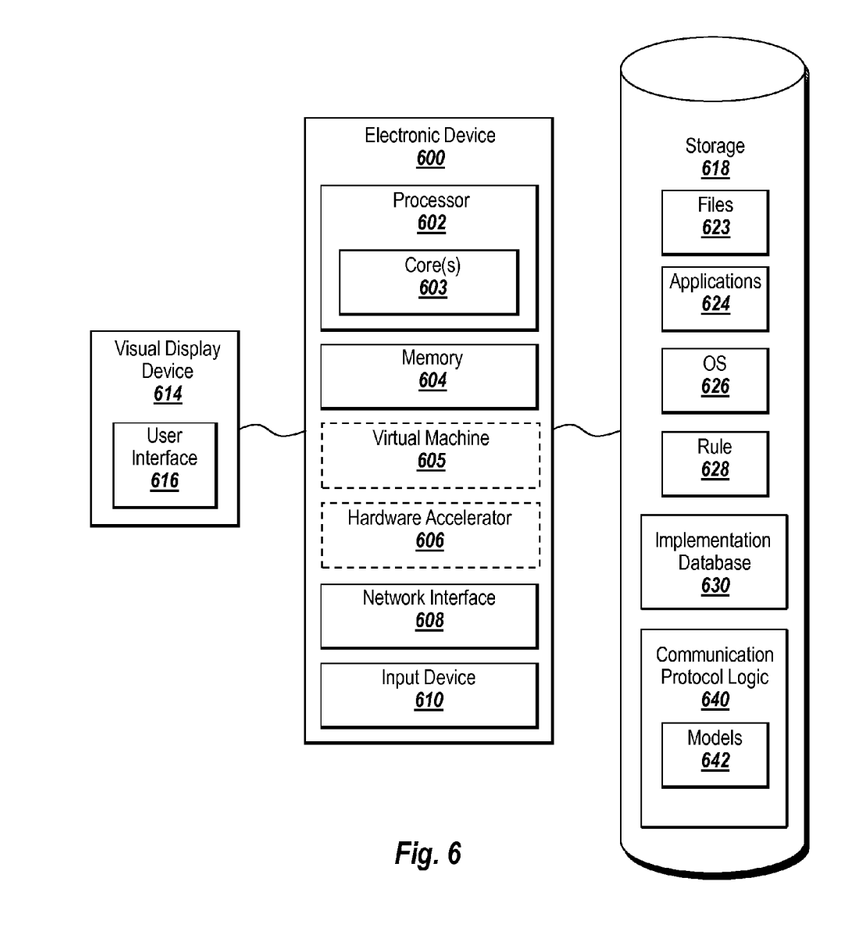
FIG. 6 depicts an exemplary electronic device suitable for use with exemplary embodiments described herein.

The network forwarding rule may be packaged into a group of network forwarding rules, which may be represented as a submodel or a model (see description of submodels and models below in connection with FIG. 6). The submodel or model may be identified by a common identifier.

The network forwarding rule, the function, the submodel, and/or the model may be written into a specification. The specification may include only the rule, function, submodel, or model, or may include multiple rules, functions, submodels, or models, possibly in conjunction with other information destined for the forwarding device.

The specification may be written in a modeling language. The modeling language may be a device-agnostic or environment-agnostic generic representation that is capable of being interpreted by different devices or operating environments. The modeling language may support multiple implementations of the rule, function, submodel, or model. The modeling language may be translated into a device-specific or operating environment-specific implementation at the forwarding device or at the controller, or at another device.

At step 520, a recommended, default, or generic implementation of the function may be provided by the controller and written into the specification. The recommended, default, or generic implementation may be retrieved from the list of rules or functions, may be stored in a library at the controller, or may be stored remotely and retrieved by the controller. At step 530, the controller may set an "Overridable?" flag to 1 to indicate that the recommended, default, or generic implementation of the function may be replaced with a natively implemented predetermined implementation at the forwarding device, if such an implementation exists at the forwarding device.

The specification may optionally provide one or more parameters for use with the function. For example, the specification may provide one or more input values to be used by the forwarding device when running the function. The parameters may be applied by the forwarding device regardless of whether the forwarding device uses a predetermined native implementation of the function, or the recommended, generic, or default implementation specified by the controller.

At step 540, the network forwarding rule may be forwarded toward the forwarding device. For example, a specification containing the network forwarding rule may be sent on an outbound interface using a transmitter (such as a wireless transmitter, Ethernet port, or other network transmission device) through a network to the forwarding device. Upon receipt of the network forwarding rule, the forwarding device may take action as described above with respect to FIG. 4.

One or more of the above-described acts may be encoded as computer-executable instructions executable by processing logic. The computer-executable instructions may be stored on one or more non-transitory computer readable media. One or more of the above described acts may be performed in a suitably-programmed electronic device. FIG. 6 depicts an example of an electronic device 600 that may be suitable for use with one or more acts disclosed herein.

The electronic device 600 may take many forms, including but not limited to a computer, workstation, server, network computer, quantum computer, optical computer, Internet appliance, mobile device, a pager, a tablet computer, a smart sensor, application specific processing device, etc.

The electronic device 600 is illustrative and may take other forms. For example, an alternative implementation of the electronic device 600 may have fewer components, more components, or components that are in a configuration that differs from the configuration of FIG. 6. The components of FIG. 6 and/or other figures described herein may be implemented using hardware based logic, software based logic and/or logic that is a combination of hardware and software based logic (e.g., hybrid logic); therefore, components illustrated in FIG. 6 and/or other figures are not limited to a specific type of logic.

The processor 602 may include hardware based logic or a combination of hardware based logic and software to execute instructions on behalf of the electronic device 600. The processor 602 may include logic that may interpret, execute, and/or otherwise process information contained in, for example, the memory 604. The information may include computer-executable instructions and/or data that may implement one or more embodiments of the invention. The processor 602 may comprise a variety of homogeneous or heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processor may include a single core or multiple cores 603. Moreover, the processor 602 may include a system-on-chip (SoC) or system-in-package (SiP).

The electronic device 600 may include one or more tangible non-transitory computer-readable storage media for storing one or more computer-executable instructions or software that may implement one or more embodiments of the invention. The non-transitory computer-readable storage media may be, for example, the memory 604 or the storage 618. The memory 604 may comprise a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (FeRAM) devices, magneto-resistive RAM (MRAM) devices, phase change memory RAM (PRAM) devices, or other types of RAM devices.

One or more computing devices 600 may include a virtual machine (VM) 605 for executing the instructions loaded in the memory 604. A virtual machine 605 may be provided to handle a process running on multiple processors so that the process may appear to be using only one computing resource rather than multiple computing resources. Virtualization may be employed in the electronic device 600 so that infrastructure and resources in the electronic device may be shared dynamically. Multiple VMs 605 may be resident on a single computing device 600.

A hardware accelerator 606, may be implemented in an ASIC, FPGA, or some other device. The hardware accelerator 606 may be used to reduce the general processing time of the electronic device 600.

The electronic device 600 may include a network interface 608 to interface to a Local Area Network (LAN), Wide Area Network (WAN) or the Internet through a variety of connections including, but not limited to, standard telephone lines, LAN or WAN links (e.g., T1, T3, 56 kb, X.25), broadband connections (e.g., integrated services digital network (ISDN), Frame Relay, asynchronous transfer mode (ATM), wireless connections (e.g., 802.11), high-speed interconnects (e.g., InfiniBand, gigabit Ethernet, Myrinet) or some combination of any or all of the above. The network interface 608 may include a built-in network adapter, network interface card, personal computer memory card international association (PCMCIA) network card, card bus network adapter, wireless network adapter, universal serial bus (USB) network adapter, modem or any other device suitable for interfacing the electronic device 600 to any type of network capable of communication and performing the operations described herein.

The electronic device 600 may include one or more input devices 610, such as a keyboard, a multi-point touch interface, a pointing device (e.g., a mouse), a gyroscope, an accelerometer, a haptic device, a tactile device, a neural device, a microphone, or a camera that may be used to receive input from, for example, a user. Note that electronic device 600 may include other suitable I/O peripherals.

The input devices 610 may allow a user to provide input that is registered on a visual display device 614. A graphical user interface (GUI) 616 may be shown on the display device 614.

A storage device 618 may also be associated with the computer 600. The storage device 618 may be accessible to the processor 602 via an I/O bus. The information may be executed, interpreted, manipulated, and/or otherwise processed by the processor 602. The storage device 618 may include, for example, a storage device, such as a magnetic disk, optical disk (e.g., CD-ROM, DVD player), random-access memory (RAM) disk, tape unit, and/or flash drive. The information may be stored on one or more non-transient tangible computer-readable media contained in the storage device. This media may include, for example, magnetic discs, optical discs, magnetic tape, and/or memory devices (e.g., flash memory devices, static RAM (SRAM) devices, dynamic RAM (DRAM) devices, or other memory devices). The information may include data and/or computer-executable instructions that may implement one or more embodiments of the invention The storage device 618 may further store applications 624, and the electronic device 600 can be running an operating system (OS) 626. Examples of OS 626 may include the Microsoft® Windows® operating systems, the Unix and Linux operating systems, the MacOS® for Macintosh computers, an embedded operating system, such as the Symbian OS, a real-time operating system, an open source operating system, a proprietary operating system, operating systems for mobile electronic devices, or other operating system capable of running on the electronic device and performing the operations described herein. The operating system may be running in native mode or emulated mode.

The storage device 618 may further include rules 628 which describe how messages should be forwarded in a communications network. The rules 628 may be used to forward messages or information received at the electronic device 628. Accordingly, the electronic device 600 may serve as a forwarding device, switch, or router.

The storage device 618 may store an implementation database 630. The implementation database 630 may be a data structure, such as a table or matrix, which stores identifiers identifying predetermined functions that are implemented by the electronic device 630. The implementation database may further store the implementation details of the predetermined functions.

The storage device 618 may further include logic for implementing a communications protocol 640. The communications protocol logic 640 may be logic for implementing a protocol which provides an interface for accessing and modifying the functionality of the forwarding plane of the electronic device 600. Exemplary communications protocols include, but are not limited to, the OpenFlow protocol (see, e.g., McKeown, Nick et al., "OpenFlow: Enabling Innovation in Campus Networks," ACM SIGCOMM Computer Communication Review Archive, vol. 38 issue 2, pp. 69-74 (April 2008), the contents of which are incorporated herein by reference) or custom communications protocols. Thus, the electronic device 600 may serve as a remote controller, such as the remote controller 140 described above with respect to FIG. 1.

The communications protocol logic 640 may allow the details of the forwarding plane implemented by the electronic device 600 to be defined and/or modified. Accordingly, the communications protocol logic 640 allows a communications network to be made programmable.

The communications protocol logic 640 may support the use of one or more models 642 to implement the functionality of the forwarding plane. A model 642 may represent the complete set of network forwarding functionality to be implemented by the electronic device 600. For example, the model 642 may define the functionality and performance of the forwarding plane.

The model 642 may incorporate one or more submodels. A submodel may represent a collection of primitive functionalities that are to be implemented in the model 642. By breaking the model 642 into submodels, modularity and compartmentalization is encouraged.

The submodels may include one or more networking primitives. A networking primitive is a basic unit of functionality to be implemented by the electronic device 600. A networking primitive may be, for example, a description of a particular functionality to be used in the communications network. A networking primitive may describe what actions the electronic device 600 is meant to perform, but typically will not include requirements for how those actions are to be carried out. Thus, a networking primitive may describe a desired outcome without providing implementation details for achieving the outcome. The implementation details may be left to the particular device implementing the networking primitive, or may be specified by an external device.

For example, a networking primitive related to queuing may specify that the electronic device 600 (acting as a forwarding device) is to implement flat queuing, hierarchical queuing, buffer resource sharing, dynamic buffer sizing, tail drop queue management, weighted tail drop queue management, or queue high and low watermarks. Scheduling primitives may specify that scheduling should be in a round robin fashion, as a weighted round robin, low latency queuing or strict priority queuing, weighted fair queuing, or class-based weighted fair queuing. Metering primitives may make use of one rate two color (1R2C) IP packet marking, 1R3C marking, or 2R3C marking. Numerous other networking primitives may also be utilized. The details of the implementations of these networking primitives may be unspecified and left up to the device that implements the primitives.

A submodel may be constructed as a collection of one or more networking primitives. For example, one submodel might specify that the electronic device 600 is to use flat queuing with round robin scheduling.

Multiple submodels may be arranged into a device model 642 that specifies all the network routing/forwarding functionality of the electronic device 600. For example, the model 642 may indicate that a first submodel is to be used under certain circumstances, such as periods of high or low network traffic or upon the receipt of certain types of packets, and that a second submodel is to be used under other circumstances. By modifying the model 642, a network administrator may cause the electronic device 600 to exhibit different network forwarding behaviors.

The communications protocol 640 may reference a model 642 (build of submodels and primitives) and implement the functionality defined by the model 642 using the functionality defined by the implementation database 630. Alternatively, the communications protocol 640 may use default or generic implementations stored locally with the communications protocol 640 or provided from a remote location, such as a remote controller.

One or more embodiments of the invention may be implemented using computer-executable instructions and/or data that may be embodied on one or more non-transitory tangible computer-readable mediums. The mediums may be, but are not limited to, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or other computer-readable media.

Figure 7:
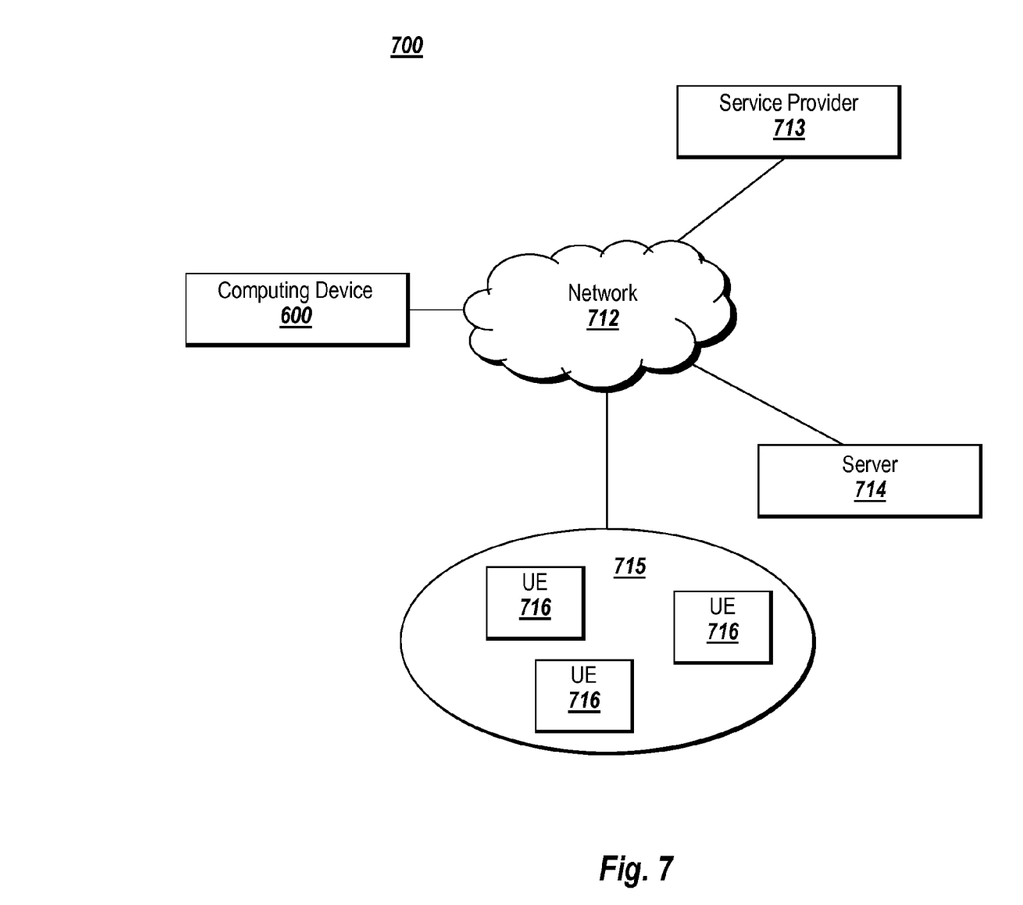
FIG. 7 depicts an exemplary network implementation of processing performed according to an exemplary embodiment.

FIG. 7 depicts a network implementation that may implement one or more embodiments of the invention. A system 700 may include a computing device 600, a network 712, a service provider 713, a target environment 714, and a cluster 715. The embodiment of FIG. 7 is exemplary, and other embodiments can include more devices, fewer devices, or devices in arrangements that differ from the arrangement of FIG. 7.

The network 712 may transport data from a source to a destination. Embodiments of the network 712 may use network devices, such as routers, switches, firewalls, and/or servers (not shown) and connections (e.g., links) to transport data. Data may refer to any type of machine-readable information having substantially any format that may be adapted for use in one or more networks and/or with one or more devices (e.g., the computing device 600, the service provider 713, etc.). Data may include digital information or analog information. Data may further be packetized and/or non-packetized.

The network 712 may be a hardwired network using wired conductors and/or optical fibers and/or may be a wireless network using free-space optical, radio frequency (RF), and/ or acoustic transmission paths. In one implementation, the network 712 may be a substantially open public network, such as the Internet. In another implementation, the network 712 may be a more restricted network, such as a corporate virtual network. The network 712 may include Internet, intranet, Local Area Network (LAN), Wide Area Network (WAN), Metropolitan Area Network (MAN), wireless network (e.g., using IEEE 802.11), or other type of network The network 712 may use middleware, such as Common Object Request Broker Architecture (CORBA) or Distributed Component Object Model (DCOM), or may use web services, such as REST services. Implementations of networks and/or devices operating on networks described herein are not limited to, for example, any particular data type, protocol, and/or architecture/configuration.

The service provider 713 may include a device that makes a service available to another device. For example, the service provider 713 may include an entity (e.g., an individual, a corporation, an educational institution, a government agency, etc.) that provides one or more services to a destination using a server and/or other devices. Services may include instructions that are executed by a destination to perform an operation (e.g., an optimization operation). Alternatively, a service may include instructions that are executed on behalf of a destination to perform an operation on the destination's behalf.

The server 714 may include a device that receives information over the network 712. For example, the server 714 may be a device that receives user input from the computer 600.

The cluster 715 may include a number of units of execution (UEs) 716 and may perform processing on behalf of the computer 600 and/or another device, such as the service provider 713 or server 714. For example, the cluster 715 may perform parallel processing on an operation received from the computer 600. The cluster 715 may include UEs 716 that reside on a single device or chip or that reside on a number of devices or chips.

The units of execution (UEs) 716 may include processing devices that perform operations on behalf of a device, such as a requesting device. A UE may be a microprocessor, field programmable gate array (FPGA), and/or another type of processing device. UE 716 may include code, such as code for an operating environment. For example, a UE may run a portion of an operating environment that pertains to parallel processing activities. The service provider 713 may operate the cluster 715 and may provide interactive optimization capabilities to the computer 600 on a subscription basis (e.g., via a web service).

Units of Execution (UEs) may provide remote/distributed processing capabilities for the applications 624. A hardware unit of execution may include a device (e.g., a hardware resource) that may perform and/or participate in parallel programming activities. For example, a hardware unit of execution may perform and/or participate in parallel programming activities in response to a request and/or a task it has received (e.g., received directly or via a proxy). A hardware unit of execution may perform and/or participate in substantially any type of parallel programming (e.g., task, data, stream processing, etc.) using one or more devices. For example, a hardware unit of execution may include a single processing device that includes multiple cores or a number of processors. A hardware unit of execution may also be a programmable device, such as a field programmable gate array (FPGA), an application specific integrated circuit (ASIC), a digital signal processor (DSP), or other programmable device. Devices used in a hardware unit of execution may be arranged in many different configurations (or topologies), such as a grid, ring, star, or other configuration. A hardware unit of execution may support one or more threads (or processes) when performing processing operations.

A software unit of execution may include a software resource (e.g., a technical computing environment) that may perform and/or participate in one or more parallel programming activities. A software unit of execution may perform and/or participate in one or more parallel programming activities in response to a receipt of a program and/or one or more portions of the program. A software unit of execution may perform and/or participate in different types of parallel programming using one or more hardware units of execution. A software unit of execution may support one or more threads and/or processes when performing processing operations.

The term 'parallel programming' may be understood to include multiple types of parallel programming, e.g. task parallel programming, data parallel programming, and stream parallel programming. Parallel programming may include various types of processing that may be distributed across multiple resources (e.g., software units of execution, hardware units of execution, processors, microprocessors, clusters, labs) and may be performed at the same time.

For example, parallel programming may include task parallel programming where a number of tasks may be processed at the same time on a number of software units of execution. In task parallel programming, a task may be processed independently of other tasks executing, for example, at the same time.

Parallel programming may include data parallel programming, where data (e.g., a data set) may be parsed into a number of portions that may be executed in parallel using, for example, software units of execution. In data parallel programming, the software units of execution and/or the data portions may communicate with each other as processing progresses.

Parallel programming may include stream parallel programming (sometimes referred to as pipeline parallel programming). Stream parallel programming may use a number of software units of execution arranged, for example, in series (e.g., a line) where a first software unit of execution may produce a first result that may be fed to a second software unit of execution that may produce a second result given the first result. Stream parallel programming may also include a state where task allocation may be expressed in a directed acyclic graph (DAG) or a cyclic graph.

Other parallel programming techniques may involve some combination of task, data, and/or stream parallel programming techniques alone or with other types of processing techniques to form hybrid-parallel programming techniques.

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware.

Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such. For example, the invention may be practiced without the use of an idle period analyzer 160 or without determining whether the system 110 is in an idle period. Thus, non-latency-sensitive requests may be divided into sub-requests and serviced without regard to whether an idle period is in effect. Alternatively, the idle period analyzer 160 could be used without splitting the non-latency-sensitive requests into sub-requests.

Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, an electronic device (e.g., a workstation) or a user of an electronic device, unless otherwise stated.

It is intended that the invention not be limited to the particular embodiments disclosed above, but that the invention will include any and all particular embodiments and equivalents falling within the scope of the following appended claims.

The invention claimed is:

1. A non-transitory computer-readable medium storing instructions that, when executed by one or more processors, cause the one or more processors to:
receive a specification at an electronic device having forwarding functionality, the specification including: a rule, an identifier for a specified function associated with a networking primitive or a collection of networking primitives to be performed by the electronic device, and an implementation of the specified function;
comparing the identifier for the specified function to a set of identifiers for known functions, the known functions having predetermined implementations that are prescribed by the electronic device;
locating the identifier for the specified function in the set of identifiers for the known functions;
disregarding the implementation of the specified function included in the specification; and
implementing the specified function on the electronic device using the predetermined implementation prescribed by the electronic device.

2. The medium of claim 1, wherein the implementation of the specified function is compiled, further storing instructions for:
recognizing a hint provided by the identifier for the specified function included in the specification, the hint regarding a role of the specified function; and
implementing the specified function using the predetermined implementation without decompiling the implementation of the specified function.

3. The medium of claim 2, wherein the specified function is associated with a collection of network primitives defining a submodel and the identifier is a group identifier associated with the submodel.

4. The medium of claim 1, wherein the predetermined implementation prescribed by the electronic device for the specified function is natively implemented in hardware in the electronic device.

5. The medium of claim 1, wherein the specification represents a description written in a modeling language.

6. The medium of claim 5, wherein the modeling language supports a plurality of implementations of the specified function.

7. The medium of claim 1, wherein the set of known functions includes an implementation for the specified function that is different from the implementation in the specification.

8. The medium of claim 1, wherein the specification provides one or more parameters for the rule.

9. The medium of claim 8, wherein the parameters are applied by the electronic device when using the predetermined implementation prescribed by the electronic device.

10. The medium of claim 1, wherein the rule is a network routing rule.

11. A method comprising:
receiving a specification at an electronic device having forwarding functionality, the specification including an identifier for a specified function associated with a networking primitive or a collection of networking primitives to be performed by the electronic device and an implementation of the specified function;
comparing the identifier for the specified function to a set of identifiers for known functions, the known functions having predetermined implementations that are prescribed by the electronic device;
failing to locate the identifier for the specified function in the set of identifiers for the known functions; and
implementing the specified function on the electronic device using the implementation specified by the specification.

12. The method of claim 11, wherein the specification represents a description written in a modeling language.

13. The method of claim 12, wherein the modeling language supports a plurality of implementations of the specified function.

14. The method of claim 11, wherein the rule is a network routing rule.

15. A system comprising:
a memory for storing, in a database, a known technique for implementing a specified function associated with a networking primitive or a collection of networking primitives; and
a processor configured to:
receive a request to apply a rule, the rule using the specified function, the request including a specification specifying an identifier for the specified function and a recommended implementation of the specified function,
look up the identifier for the specified function in the database,
override the recommended implementation in the request in favor of the known technique stored in the database, and
apply the rule using the known technique.

16. The system of claim 15, wherein the implementation of the specified function is compiled, further storing instructions for:
recognizing a hint provided by the identifier for the specified function included in the specification, the hint regarding a role of the specified function; and
implementing the specified function using the predetermined implementation without decompiling the implementation of the specified function.

17. The system of claim 16, wherein the specified function is associated with a collection of network primitives defining a submodel and the identifier is a group identifier associated with the submodel.

18. The system of claim 15, wherein the predetermined implementation prescribed by the electronic device for the specified function is natively implemented in hardware in the system.

19. The system of claim 15, wherein the specification provides one or more parameters for the rule.

20. The system of claim 19, wherein the parameters are applied by the electronic device when using the predetermined implementation prescribed by the electronic device.

21. The system of claim 15, wherein the rule is a network routing rule.

22. A routing system comprising:
a routing controller that formulates a specification for a forwarding device, the specification incorporating an identifier for a specified function associated with a networking primitive or a collection of networking primitives, the specification specifying a recommended implementation of the specified function and providing a flag indicating that the recommended implementation may be overridden if the forwarding device natively implements the specified function; and
a transmitter for forwarding the rule towards the forwarding device.

* * * * *